UNITED STATES PATENT OFFICE.

JOHN CUMBERLAND OF MOBILE, ALABAMA, AND W. W. CUMBERLAND, OF NEW ALBANY, INDIANA.

IMPROVEMENT IN LUBRICATING COMPOUNDS.

Specification forming part of Letters Patent No. 6,263, dated April 3, 1849.

*To all whom it may concern:*

Be it known that we, JOHN CUMBERLAND, of the city and county of Mobile, State of Alabama, and WILLIAM W. CUMBERLAND, of New Albany, Floyd county, State of Indiana, have jointly invented a new and useful composition of matter (called "Metallic Oil") for lubricating steam-cylinders, wheels of vehicles, and machinery of all kinds, for softening hemp and other fibrous substances preparatory to spinning the same, and for other purposes; and we do hereby declare that the following is a full and exact description of our said invention or discovery.

The nature of our invention consists in forming a base for the lubricating mixture by combining potash or other alkaline substance with fresh water and oil, lard or resin, or other oily, fatty, or resinous substance in such or nearly such proportions as will neutralize the alkaline properties, and then combining or mixing with the said base more fresh water and pulverized steatite or other analogous substance.

To enable others skilled in the art to make and use my invention, we proceed to describe the usual proportions of the several ingredients which we employ and the manner in which we prefer to compound them, to wit:

We first dissolve common potash in hot water until the specific gravity of the solution is indicated by about 12° (twelve degrees) of Baumé's hydrometer. Into this solution we put a quantity of quick lime equal in weight to about one-third of the potash contained in the solution, and boil the whole together about fifteen minutes. We then allow the insoluble matter to subside, take off the liquid portion, and boil it again till the specific gravity is about 15° (fifteen degrees) of Baumé. We then take twenty-four gallons of crude whale-oil and raise its temperature to 150° (one hundred and fifty degrees) Fahrenheit. With this oil we mix about one gallon of the above described concentrated solution and raise the temperature of the mixture to about 212°, then gradually add about six gallons of water and raise the temperature to or nearly to the boiling-point of the mixture.

The above-described process produces the base for our metallic oil. To this base we add (so slowly as not to lower the temperature materially) more water (about twelve gallons) until the mixture assumes a whitish, opaque appearance, and keep it at or near its boiling-point for about two hours. We then mix with it about sixty pounds of steatite, the steatite being previously pulverized and mixed, and with about double it own weight of water. If when the steatite is added the union of the previous ingredients appears to be disturbed, more heat should be applied till they reunite.

Other substances analogous to steatite may be used instead of it or with it, and pulverized plumbago may also be added to the mixture.

To make metallic oil for lubricating machinery we prefer to use lard or lard-oil instead of crude whale-oil for forming the base. The quantity of any kind of oil or grease required to make the said base exactly neutral may be determined by the following test: When the alkaline solution and the oil or grease have been boiled and stirred together with the six gallons of water, as above described, the mixture or compound ought to be nearly transparent, and if litmus-paper, reduced by an acid, be then dipped in the mixture, the color of the paper ought not to be changed. If the mixture gives the paper a bluish tinge, more oil or grease should be added.

To ascertain whether there is an excess of oil or grease in the mixture, we dip out a small quantity and mix it with cold water. If any oil or grease rises to the surface, then more of the alkaline solution may be added. For most purposes, however, a slight excess of either ingredient of the base is not important.

The proportions of water and steatite or other analogous substance to be added to the base may be varied considerably, according to the use to which the mixture is to be applied.

To make metallic oil with resin, we take two and a half gallons of the alkaline solution at 12° Baumé and raise its temperature to about 212° Fahrenheit; then add about sixteen pounds of common resin, pulverized, and heat till all the mixture becomes of the consistence of paste; then gradually add about three gallons of water, boil about one hour, and then mix in about ten pounds of pulverized steatite and three pounds of plumbago. Oil or lard may also be used with the resin.

Instead of forming the base as above described, a part of the ingredients may be first combined into ordinary soap, and the soap afterward rendered neutral by the addition of more oil, grease, or resin.

Our lubricating-mixture is more durable than others heretofore in use, is less liable to burn or to become gummy on machinery, and causes a greater reduction of friction and wear.

Having thus particularly described our invention, what we claim therein as new, and desire to secure by Letters Patent, is—

The combining of potash (or other alkaline substance) with water and oil, lard, or resin, (or other oily, fatty, or resinous substance,) by the process substantially as herein described, into a neutral or nearly neutral compound as a base for a lubricating-mixture, substantially as above described.

In testimony that the foregoing is a true specification of our said invention we have hereto set our hands this 1st day of November, in the year 1848.

JOHN CUMBERLAND.
WM. W. CUMBERLAND.

In presence of—
THOS. S. SOMMERS,
CHAS. H. WATERBURY.